3,245,809
GOLD ARYL MERCAPTIDES AND DECORATING COMPOSITIONS CONTAINING SAME
Howard M. Fitch, Summit, N.J., assignor to Engelhard Industries, Inc., Newark, N.J., a corporation of Delaware
No Drawing. Filed Apr. 9, 1962, Ser. No. 185,819
6 Claims. (Cl. 106—1)

This invention relates to new and improved gold decorating compositions, a method of decorating with such compositions, novel gold aryl mercaptides for use in the decorating compositions, and a process for preparing such mercaptides.

Gold decorating compositions containing gold sulfo-resinates are known to the art and have been described, for example, by Boudnikoff, Compt. rend., 196, 1898 (1933), and by Chemnitius, J. Prakt. Chem. 117, 245 (1927). The gold sulfo-resinates are prepared by reacting a gold salt with a sulfurized terpene such as sulfurized Venetian turpentine. They are dissolved in vehicles such as oils of lavender, rosemary, aniseed, sassafras, wintergreen and fennel, turpentine, various terpenes, nitrobenzene, amyl acetate and the like, and mixed with gold fluxes such as salts and resinates of rhodium, chromium, bismuth, lead, cadmium, tin, copper, cobalt antimony and uranium, Assyrian asphalt and various rosins to form gold decorating compositions. More recently, it has been proposed in U.S. Patent No. 2,490,399 to use gold cyclic terpene mercaptides in place of gold sulfo-resinate in such compositions. The structures of these gold cyclic terpene mercaptides have never been elucidated, and the location of the mercaptide group in the molecule is not known. The gold mercaptide of thioborneol has been prepared by Nakatsuchi, J. Soc. Chem. Ind., Jap., 38, Suppl. 617B (1935), although the use of this material in gold decorating compositions has not been described.

Gold decorating compositions are compositions that form a film of metallic gold when applied to various surfaces and heated. Such compositions, which have been known for a hundred years or more, have been based on a cyclic terpene technology. The gold compounds in such compositions have been derivatives of cyclic terpenes and sulfur, originally in the form of sulforesinates and more recently in the form of cyclic terpene mercaptides. It has been assumed that the cyclic terpene radical is somehow essential to gold compounds suitable for use in gold decorating compositions, and other organic gold compounds have not been employed. The gold compounds derived from cyclic terpenes have the disadvantage of requiring relatively high firing temperatures, limiting their use to refractory substrates such as glass, ceramics, quartz and the like. They have the further disadvantage of being derived from natural products that are in variable supply and of variable composition.

In accordance with the present invention, the gold decorating composition comprises a gold aryl mercaptide and a vehicle therefor. More specifically, the gold aryl mercaptide is one having the formula Ar—S—Au wherein Ar is an aryl radical and the mercapto sulfur is attached directly to an aromatic ring of the aryl radical. Aryl radicals which can be present as the Ar of the foregoing formula for the gold aryl mercaptides of this invention include mononuclear and polynuclear radicals. Exemplary of such aryl radicals are phenyl, tolyl, xylyl, naphthyl, anthryl, phenanthryl, halogenophenyl, aminophenyl and carboxyphenyl.

The obtainment of the good gold decorating compositions utilizing the gold aryl mercaptides of this invention together with vehicles was unexpected and surprising. One reason for the expectation that the gold aryl mercaptides of this invention would not be satisfactory as decorating compositions when combined with a vehicle was the presence of the relatively rigid, conjugated aromatic nucleus attached directly to the mercapto sulfur bearing the gold atom in the gold aryl mercaptides, this relatively rigid, conjugated aromatic nucleus being expected to interfere with the smooth decomposition of the compound to a metallic film during firing. This relatively rigid, conjugated aromatic nucleus of the gold aryl mercaptide is contrasted with the relatively non-rigid non-conjugated aliphatic nucleus of any of the gold primary, secondary or tertiary mercaptides which are characterized by having respectively one, two, or three carbon atoms on the carbon atom attached directly to the sulfur atom. In order for a precious metal compound to qualify for use in decorating compositions it must be capable of decomposing smoothly under firing conditions to leave a continuous coherent film free or substantially free of carbon or carbonaceous materials. The precious metal films obtained from such decorating compositions are extremely thin, and they owe their esthetic, reflective, conductive and other useful properties to the fact that the metal is evenly and continuously distributed upon the substrate. If the same amount of metal is deposited as blobs or globules on the substrate, it does not have these useful properties. Virtually nothing is known about the mechanism of this film formation or of the fate of the organic portion of the precious metal compound during the firing, and it is virtually impossible to predict what classes of precious metal compounds will be useful in decorating compositions. And, as pointed out supra, the presence of the relatively rigid, conjugated aromatic nucleus attached to the mercapto sulfur bearing the gold atom in the gold aryl mercaptides was expected to interfere with their smooth decomposition to a metallic film but surprisingly this was not the case and useful, continuous, coherent metallic films were obtained from decorating compositions containing the gold aryl mercaptides. Further, certain of the gold aryl mercaptides of this invention fire to a metallic film at remarkably low temperatures, appreciably lower than those required for firing gold primary, secondary or tertiary alkyl mercaptides, gold aralkyl mercaptides, and cyclic terpene mercaptides or gold sulforesinates. And this lower firing temperature of the gold aryl mercaptides was also surprising and unexpected, and is of importance when decorating non-refractory substrates which are subject to destruction or deterioration at higher firing temperatures. Further, the preferred gold aryl mercaptides of this invention were unexpectedly found to have excellent solubility in organic vehicles. This property of excellent or good solubility in organic vehicles is important inasmuch as for good results in the decorating compositions of this invention exclusive of the burnish gold decorating composition, the precious metal compound has to possess good solubility in the vehicle.

A particularly preferred class of aryl radicals is that in which at least one alkyl group containing at least three carbon atoms and preferably from about 4-12 carbon atoms, is directly attached to an aromatic ring of the aryl nucleus. The nuclear-substituted gold aryl mercaptides including at least one alkyl group containing at least three carbon atoms directly attached to the aryl nucleus are particularly useful as constituents of gold decorating compositions because of their very remarkable and unexpected solubility in organic solvents. Generally speaking, gold aryl mercaptides of low solubility in organic solvents are suitable only for use in burnish gold decorating compositions. Gold aryl mercaptides of high solubility in organic solvents are useful not only in burnish gold decorating compositions but also in bright gold decorating compositions, which give gold films that require no burnishing operation and are hence much cheaper to produce. As an example of the extraordinary effect of such nuclear alkyl substituents on solubility in organic solvents, the solubility of gold p-tert.-butylphenyl mercaptide in chloroform at room temperature exceeds 30 percent by weight, whereas the solubility of gold phenyl mercaptide under the same conditions is only about 0.0062 percent by weight. Similarly, the solubility of gold o-methyl-p-tert.-butylphenyl mercaptide in toluene at room temperature exceeds 40 percent by weight, whereas the solubility of gold o-methylphenyl mercaptide under the same conditions is only about 0.013 percent by weight. Similar solubility increases of a thousand-fold or more are obtained with other nuclear alkyl substituents containing three or more carbon atoms and in other organic solvents. Examples of the preferred nuclear-substituted gold aryl mercaptides having at least one alkyl group containing at least three carbon atoms directly attached to the aryl nucleus include gold p-isopropylphenyl mercaptide, gold p-tert.-butylphenyl mercaptide, gold o-methyl-p-tert.-butylphenyl mercaptide, gold p-nonylphenyl mercaptide, gold p-dodecylphenyl mercaptide, gold p-octadecylphenyl mercaptide, gold 2,4-diisopropylphenyl mercaptide and gold 2,4-ditert.-butylphenyl mercaptide.

An outstanding advantage of some of the gold decorating compositions of this invention is their requiring only relatively low temperatures to form a metallic film, which is due to the presence of the gold aryl mercaptides. By reason of requiring only relatively low temperatures for forming the metallic films, some of these decorating compositions are well suited for decorating non-refractory materials including a wide range of plastics, plastic laminates, wood, paper, textiles, leather and the like which would be damaged by the use of high temperatures. The gold decorating compositions previously used required relatively high temperatures, due to the gold compounds present therein, to form a metallic film, and hence their application was limited to decoration of relatively refractory materials such as glass, ceramics, metals, quartz, carbon, mica, and other materials that were not damaged by the high temperatures required. The gold decorating composition of this invention can be applied to these relatively refractory materials and some can be applied as well to the non-refractory materials previously mentioned. The gold compounds present in the gold decorating compositions of this invention have the further advantage of being of fixed and readily reproducible composition, since they are not derived from natural products such as cyclic terpenes.

Further, while the ability to form a decorative film of precious metal at relatively low temperature is an outstanding property of some of the gold decorating compositions of this invention, the use of the gold decorating compositions of this invention also is meritorious in attaining production of films of metallic gold which exhibit (1) a high degree of reflectivity to light and particularly to infrared radiation, making them useful as reflectors for lamps, ovens, and the like; (2) electrical conductivity making them useful in forming printed circuits and resistors and as bases for soldering connections to non-conductive materials, for electroplating and plating by dipping in molten metals and alloys; and (3) chemical inertness, making them useful for protecting the underlying surface from corrosion, oxidation and the like.

In a preferred embodiment, the gold decorating compositions contain a gold flux in addition to the vehicle and the gold aryl mercaptide. The choice of ingredients for the flux determines the behavior of the gold film during and after firing, and is usually dictated by the composition of the article to be decorated and the use for which it is intended. The flux will usually contain small amounts of salts or resinates of rhodium or iridium to improve the continuity and brilliance of the gold film. Other ingredients such as salts and resinates of bismuth, chromium, lead, cadmium, tin, copper, cobalt, antimony and uranium are employed to improve the adherence of the gold film and its resistance to abrasion. The ingredients fuse to a low melting glass or glaze as a result of the firing. The conventional glazes can not be used to promote adherence of the gold film to non-refractory materials such as plastics and plastic laminates and the gold film on such material may be protected, if desired, by a coating of lacquer or varnish or by laminating a thin film of plastic to the surface. The lacquer may also be incorporated in the gold decorating compositions to provide an adherent film.

The vehicles which can be utilized in the decorating compositions of this invention include, in addition to simple solvents, mixtures of essential oils, terpenes, resins and the like, carefully chosen to impart specific physical properties to the composition. The choice of vehicle controls the behavior of the composition before firing and is dictated by the method by which the composition is to be applied. The physical properties imparted to the composition by the vehicle chosen, such as oiliness, viscosity, evaporation rate, surface tension and tack, will vary for different methods of application, such as brushing, spraying, stippling, stamping, printing, both direct and offset, hot or cold screen printing, stenciling, decalcomania and the like. Typical vehicles include mixtures of two or more of the following ingredients: methyl ethyl ketone, cyclohexanone, ethyl acetate, amyl acetate, cellosolve, butanol, nitrobenzene, toluene, xylene, petroleum ether, chloroform, carbon tetrachloride, various terpenes such as pinene, dipentene, dipentene oxide and the like, essential oils such as oils of lavender, rosemary, aniseed, sassafras, wintergreen, fennel, and turpentine, Assyrian asphalt, various rosins and balsams, and synthetic resins. For special applications such as compositions for hot screening, special vehicles such as waxes and thermoplastic resins may be used. Such compositions, when applied through a hot screen to an article maintained at a relatively lower temperature, immediately set to a hard film and are more fully described in copending U.S. patent application Serial No. 14,168, filed March 11, 1960, now U.S. Patent 3,092,504.

The gold aryl mercaptides may be prepared by admixing an aryl mercaptan of the formula Ar-S-H wherein Ar is an aryl radical and the mercapto sulfur is attached directly to an aromatic ring of the aryl radical with a gold salt, such as auric bromide, auric iodide, potassium bromaurate or potassium iodoaurate. Auric chloride or potassium chloraurate are preferred, however, since they are more stable and easy to prepare. Auric chloride is prepared by dissolving metallic gold in aqua regia and removing the nitric acid present by repeated evaporations with hydrochloric acid. Removal of the excess hydrochloric acid is not necessary, and the resulting solution, known as gold liquor, is suitable for use in preparing gold aryl mercaptides. The gold liquor may be diluted with water before use, or solvents such as ethyl acetate or methanol may be used. Preferably from three to four moles of mercaptan per mole of auric chloride are used, and higher ratios may be employed, but without substantial advantage. The reaction temperature may vary from about 0° C. to about 100° C. Usually, it is preferable to mix the mercaptan and gold salt in a suitable solvent at a temperature in the range of about 10 to about 50° C. and to complete the reaction by heating to temperatures in the range of about 60 to about 80° C. The reaction is somewhat exothermic, and it is usually preferable to add one reactant to the other slowly or in increments with cooling if required. The reaction product is obtained as an oil or an oily solid containing any excess mercaptan and large amounts of disulfides formed in the reaction. The product is purified by washing or leaching with methanol, or with mixtures of methanol with acetone, isopropanol or benzene. Some of the gold aryl mercaptides may be further purified by crystallization from a suitable solvent such as toluene.

In this method of preparation, disulfides are formed according to the following reaction, in which Ar has the foregoing significance:

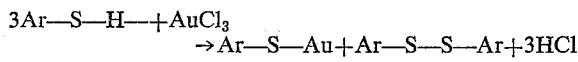
3Ar—S—H +AuCl₃
→ Ar—S—Au+Ar—S—S—Ar+3HCl

Thus, for every mole of mercaptan combined as gold mercaptide, two moles of mercaptan form the disulfide. This is disadvantageous, particularly when the more expensive mercaptans are used and with mercaptans forming the more soluble gold mercaptides, since substantial amounts of gold mercaptide are lost in separating the disulfide. It would, therefore, be advantageous to employ an aurous salt such as aurous chloride in the reaction in order to eliminate disulfide formation. Aurous salts are notoriously difficult to make, however, and are of poor stability, and they tend to be contaminated with greater or lesser amounts of metallic gold. Some success has been claimed for the use of aurous cyanide in various reactions, but the use thereof is complicated by the toxic nature of the hydrogen cyanide produced as a by-product.

Alkyl sulfides are known to react with auric halides to give alkyl sulfide-aurous halide complexes according to the following equation in which R is a lower alkyl group, for instance methyl, ethyl, butyl or octyl, and X is halogen, for instance chlorine, bromine or iodine:

2R₂S+AuX₃+H₂O→R₂S·AuX+R₂SO+2HX

In accordance with the present invention, it has been found that the alkyl sulfide-aurous halide complexes disclosed supra react with aryl mercaptans to give gold aryl mercaptides according to the following equation in which Ar, R and X have the foregoing significance:

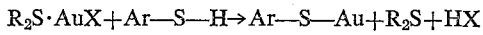
R₂S·AuX+Ar—S—H→Ar—S—Au+R₂S+HX

The reaction proceeds smoothly at normal or room temperatures to give high yields of gold aryl mercaptides that are uncontaminated with disulfides or metallic gold. Use of the methyl sulfide-aurous chloride complex or of the ethyl sulfide-aurous chloride complex is preferred, since auric chloride and methyl and ethyl sulfides are readily available as starting materials and the sulfoxides and excess sulfides are readily removed from the product. In forming the alkyl sulfide-aurous halide complex, reaction temperatures between about 0° C. and about 40° C., preferably between about 15° C. and about 25° C. are employed. The reaction is effected by preferably mixing the alkyl sulfide and gold halide in an aqueous medium at the temperatures stated and, without isolating the reaction product, adding the aryl mercaptan to the reaction mixture. The lower alkyl sulfide-aurous halide complexes tend to decompose upon exposure to air and upon attempted isolation or purification, with the formation of metallic gold. This decomposition is avoided by using excess lower alkyl sulfide and by not isolating the lower alkyl sulfide-aurous halide complex. An excess of about one mole is sufficient to prevent decomposition, and it is preferred to use a total of about 3 moles of lower alkyl sulfide per mole of auric halide. Higher ratios may be used, but without substantial advantage. Temperatures much in excess of 40° C. should be avoided due to the volatility of the lower alkyl sulfides and the instability of the complex. Temperatures much below 0° C. should also be avoided due to the tendency of the aqueous reaction mixture to freeze, although somewhat lower temperatures may be used with solvents such as methanol. The reaction between the lower alkyl sulfide and the auric halide is somewhat exothermic, and cooling of the reaction mixture usually will be required. The reaction of the complex with the aryl marcaptan is only very mildly exothermic, and little cooling is required for this reaction. Other solvents such as methanol may be used, but it is apparent from the above equations that at least one mole of water is required for the reaction. When the gold salt is in the form of gold liquor, sufficient water usually will be available, but when anhydrous gold salts are used in solvents other than water, at least one mole of water per mole of gold salt should be present in the reaction mixture. The gold aryl mercaptides may be recovered from the reaction mixture by filtration or in the case of the more soluble gold aryl mercaptides by extraction with a suitable solvent such as chloroform or toluene, and they may be purified, if desired, by washing with water and with methanol and in some cases by crystallization from a suitable solvent such as toluene or ethyl acetate.

Although the aryl mercaptides of this invention are aurous mercaptides, they are referred to herein simply as gold mercaptides, since auric mercaptides are not known and the same aurous mercaptide is obtained from auric salts and from aurous salts. Pure aryl mercaptans are not essential to the practice of this invention, and commercial grades are suitable. Mixtures of aryl mercaptans may also be employed for reaction with the organic sulfide-aurous halide complex to give mixtures of gold arcyl mercaptides that are suitable for use in gold decorating compositions.

As previously pointed out, the gold compounds previously used in decorating compositions required relatively high temperatures to form a metallic film, limiting their application to the decoration of relatively refractory materials such as glass, ceramics, metals, quartz, carbon, mica and other materials that were not damaged by the high temperatures required. An outstanding advantage of some of the gold aryl mercaptide-containing decorating compositions of this invention is the relatively low temperature required to form a metallic film therefrom, extending their application to a wide range of plastics, plastic laminates, wood, paper, textiles, leather and the like that would be damaged and/or destroyed by high temperatures. A roughly quantitative estimate of the firing temperatures required was made by brushing solutions or suspensions in toluene, adjusted to a gold content of 10 percent, onto glass slides. After evaporation of solvent, the slides were heated for one hour in a precisely controlled mechanical convection oven, and the films obtained were tested for electrical conductivity. The test were repeated at temperature intervals of 5° C. to determine with 5° C. the minimum temperature required to produce conductivity showing the formation of a continuous film of metallic gold on the slide. It will be recognized that firing would ordinarily be conducted at a higher temperature or for a longer period of time or both in order to obtain maximum conductivity and brilliance of the film. Nevertheless, the minimum firing temperatures obtained in this manner give a reproducible index of the relative temperatures required for practical decorating compositions. The results of these tests, listed in Table I, show that the compounds of the present invention fire to metallic films at temperatures below those required for the gold sulforesinates of the prior art.

TABLE I.—MINIMUM TEMPERATURES REQUIRED TO OBTAIN A CONDUCTIVE FILM IN ONE HOUR

| Example | Compound | Temp., °C. |
| --- | --- | --- |
| Prior art | Gold sulforesinate | 270 |
| 1-A | Gold phenyl mercaptide | 115 |
| 1-B | Gold o-methylphenyl mercaptide | 215 |
| 1-C | Gold m-methylphenyl mercaptide | 130 |
| 1-D | Gold p-methylphenyl mercaptide | 135 |
| 1-E | Gold mixed methylphenyl mercaptides | 100 |
| 1-F and 2 | Gold p-tert.-butylphenyl mercaptide | 230 |
| 1-G | Gold p-nonylphenyl mercaptide | 210 |
| 1-H | Gold o-methyl-p-tert.-butylphenyl mercaptide | 105 |
| 1-I | Gold 2-naphthyl mercaptide | 250 |
| 1-J | Gold p-chlorophenyl mercaptide | 130 |
| 1-K | Gold pentachlorophenyl mercaptide | 230 |
| 1-L | Gold o-carboxy-phenyl mercaptide | 225 |
| 1-M | Gold o-aminophenyl mercaptide | 255 |
| 3 | Gold mixed dimethylphenyl mercaptides | 215 |

The ability to form a metallic film at relatively low temperatures is a distinct advantage even in applications on relatively refractory materials where it may be desirable to heat the material to the point of incipient softening, which may vary from about 500° C. for a soft glass to about 800° C. for a ceramic glaze and even higher for refractory materials such as quartz to improve the adherence of the metallic film. The initial formation of the metallic film should take place in an oxidizing atmosphere in order to promptly and completely remove organic matter from the film. This oxidizing atmosphere is usually provided by good ventilation of the oven or kiln in which the metallic film is produced, and such ventilation becomes increasingly difficult and costly with increases in temperature, since heat is lost to the air introduced by ventilation. Once the metallic film has been developed, further heating may be accomplished without good ventilation and consequent heat loss.

Among the gold decorating compositions of this invention, the preferred compositions are the liquid bright golds, which give specular bright films on firing. Generally speaking, the ingredients of the liquid bright golds are all soluble in the vehicles employed, giving clear solutions, or become soluble in the vehicles in the process of firing. Another class of gold decorating compositions are the burnish gold decorating compositions such as are described, for example, by Chemnitius, J. Prakt. Chem., 117, 245 (1927), by Ballard in U.S. Patent No. 2,383,704, and by Chandra in British Patent No. 731,906. Generally speaking, such compositions contain insoluble ingredients such as, for example, gold powder, mercuric oxide, bismuth subnitrate and lead borate. They are employed as pastes or suspensions rather than as solutions and fire to gold films that are dull and matte in appearance. On burnishing, the films so obtained take on the soft golden luster characteristic of burnished gold. The addition of the gold aryl mercaptides of this invention to such compositions gives films that are brighter and require less burnishing than those obtained from the conventional burnish golds. As may be seen from the examples that follow, gold aryl mercaptides may be employed with advantage as the sole gold compounds in burnish gold decorating compositions.

Another class of gold decorating compositions is the gold lusters. These lusters resemble liquid bright gold in composition, but contain relatively less gold and more gold flux. Instead of firing to a conductive film of bright gold, the gold luster compositions give non-conductive films of various colors, depending upon the amount of gold present and the nature of the gold flux, having a characteristic golden sheen or luster. The colors produced are believed to result from the presence in the film of colloidal metallic gold in various particle sizes. The gold aryl mercaptides of this invention are suitable ingredients for such luster compositions.

The gold aryl mecaptides of this invention are also suitable for use in decorating compositions containing other precious metals such as platinum, palladium and silver that serve to modify the color, appearance, reflectivity and electrical conductivity of the metallic film formed on firing. Platinum and palladium in such compositions give films ranging from reddish gold to silver to grey to black with increasing amounts of platinum or palladium. Silver compounds such as silver resinate give films of a lemon yellow color and with increasing amounts of silver of a greenish yellow color. Platinum and palladium resinates and sulforesinates such as those described by Chemnitius, Sprechsaal, 60, 226 (1927), and by Ernst in U.S. Patent No. 1,954,353 may be employed in such compositions. Preferably, however, lower firing platinum and palladium compounds such as those described in U.S. Patent No. 3,022,177 and in my copending U.S. patent application 60,575, filed October 5, 1960, are employed to take full advantage of the low firing characteristics of the gold aryl mercaptides of the invention.

The gold content of gold decorating compositions varies with the method of application and intended use. Generally speaking, gold lusters contain about 0.1-3 percent gold, liquid bright golds for spraying contain about 2-10 percent gold, liquid bright golds for brushing contain about 5-15 percent gold, gold compositions for screening or stamping contain about 8-25 percent gold, and burnish golds may contain about 12-40 percent or more of gold, the percentages being by weight.

Firing temperatures employed range between about 150 and 1350° C., preferably between about 200 and 800° C. Of course, the particular firing temperature will depend on the substrate being decorated and will be considerably lower when decorating thermoplastic materials than when decorating ceramics or ferrous metals such as stainless steel. It is usually advantageous to fire to the incipient softening point of the substrate. Temperatures of between 150 and 300° C. are advantageous for firing the applied decorating composition on thermoplastic articles, and temperatures between about 350 and 750° C. are advantageous for firing the applied decorating material on glass. Firing temperatures between about 450 and 700° C. are advantageously used for firing the decorating material on stainless steel, and firing temperatures between about 350 and 900° C. are advantageously used when firing the decorating material on porcelain and glazed earthenware. For some special applications such as decorating and ceraming glass-ceramics in a single firing operation, temperatures as high as 1350° C. are required. Such high temperatures may require special fluxes such as resinates of tantalum and niobium as described in copending U.S. patent application No. 99,046, filed March 29, 1961 by Peter J. Murphy and assigned to applicant's assignee. In every case, the firing is carried out for a time sufficient to decompose the gold aryl mercaptides and volatilize the decomposition products.

In the specific examples that follow, test pieces coated with the decorating compositions of the invention were fired under various conditions. Where kiln firing is specified, it is to be understood that the pieces were placed in a kiln which was heated to a specified temperature, held at about this temperature for about 10 minutes and cooled, the total operation requiring an hour or more. Where lehr firing is specified, it is to be understood that the pieces were passed through a continuous lehr having a specified peak temperature, passage through the lehr requiring from one and one-fourth to one and one-half hours. Where infra-red firing is specified, the pieces were placed under an infra-red heat source giving a temperature of the order of 250° C. for a specified period of time. It is to be understood that the metallic films formed in each case were adherent and good conductors of electricity unless otherwise noted.

The gold aryl mercaptides that are obtained as solids do not melt sharply by the capillary tube method, and their decomposition temperatures depend upon the rate of heating, becoming lower with slower rates of heating. The melting and decomposition points given in the examples following were obtained in capillary tubes heated at the rate of about 5° C. per minute.

The invention will be further illustrated by reference to the following examples:

*Example 1.—Preparation of gold aryl mercaptides from aurous chloride-ethyl sulfide*

In a typical preparation, 0.2 mole of gold in the form of gold liquor was added to a mixture of 0.6 mole ethyl sulfide and 100 ml. water during 15 minutes with stirring and cooling to maintain the temperature between 15 and 20° C. After stirring fo 15 minutes longer to insure completion of the reaction, the product was a colorless upper aqueous layer and a colorless to pale yellow lower layer consisting principally of aurous chloride-ethyl sulfide complex and ethyl sulfide. Then 0.22 mole of an aryl mercaptan was added with stirring over a period of time ranging from 10 minutes to 2 hours, maintaining the temperature of the reaction mixture at 20° C. or lower, and the mixture was stirred at about room temperature for one-half to 2 hours longer to insure completion of the reaction. Solid aryl mercaptans were dissolved in methanol or chloroform before addition. The gold aryl mercaptide, which precipitated as a granular solid or paste, was allowed to settle, and the aqueous layer was removed by decantation or by siphoning. The residual layer was washed by stirring with several 250 ml. portions of water, removing the aqueous layer after each wash. The residual layer was then washed in the same manner with methanol and filtered. The precipitate was washed on the filter with methanol and dried at room temperature. In some cases, particularly after the addition of methanol, the precipitate was too flocculent to be washed by decantation and was washed only on the filter. The gold aryl mercaptides listed below were prepared in the above manner. Yields were almost quantitative.

A. *Gold phenyl mercaptide*, prepared from benzenethiol, was obtained as a pale yellow solid containing 63.5 percent gold that decomposed without melting ca. 155° C.

B. *Gold o-methylphenyl mercaptide*, prepared from o-methylbenzenethiol, was obtained as a very pale yellow solid containing 61.5 percent gold that melted with decomposition ca. 177° C.

C. *Gold m-methylphenyl mercaptide*, prepared from m-methylbenzenethiol, was obtained as a yellow solid containing 60.7 percent gold that decomposed without melting ca. 170° C.

D. *Gold p-methylphenyl mercaptide*, prepared from p-methylbenzenethiol, was obtained as a very pale yellow solid containing 61.5 percent gold that decomposed without melting ca. 163° C.

E. *Gold mixed methylphenyl mercaptides*, prepared from a commercial mixture of methylbenzenethiols containing about 35 percent o-methylbenzenethiol, 50 percent m-methylbenzenethiol and 15 percent p-methylbenzenethiol, was obtained as a yellow solid containing 61.4 percent gold that decomposed without melting ca. 106° C.

F. *Gold p-tert.-butylphenyl mercaptide*, prepared from p-tert.-butylbenzenethiol, was obtained as a yellow solid containing 52.8 percent gold that darkened above 235° C. and melted with decomposition about 265° C.

G. *Gold p-nonylphenyl mercaptide* was prepared from p-nonylbenzenethiol. After washing with water and methanol, it was obtained as an oil that slowly solidified. This was dissolved in 50 ml. chloroform, and the solution was added dropwise with good agitation to 1.2 liters of methanol, giving a yellow powder that was removed by filtration and dried. It contained 43.2 percent gold, softened ca. 118° C. and melted indefinitely between 180 and 195° C.

H. *Gold o-methyl-p-tert.-butylphenyl mercaptide*, prepared from o-methyl-p-tert.-butylbenzenethiol, was obtained as a pale yellow solid containing 50.2 percent gold that melted at 251° C.

I. *Gold 2-naphthyl mercaptide*, prepared from 2-naphthalenethiol, was obtained as a yellow solid containing 53.2 percent gold that decomposed without melting ca. 144° C.

J. *Gold p-chlorophenyl mercaptide*, prepared from p-chlorobenzenethiol, was obtained as a yellow solid containing 57.5 percent gold that melted with decomposition ca. 172° C.

K. *Gold pentachlorophenyl mercaptide*, prepared from pentachlorobenzenethiol and washed well with benzene after washing with water and methanol, was obtained as an off-white solid containing 40.6 percent gold that melted with decomposition ca. 230° C.

L. *Gold o-carboxy-phenyl mercaptide*, prepared from o-mercaptobenzoic acid and washed with ethyl acetate after washing with water and methanol, was obtained as a dark yellow solid containing 56.3 percent gold that decomposed without melting ca. 154° C.

M. *Gold o-aminophenyl mercaptide* was prepared from o-aminobenzenethiol. Before adding the mercaptan, the aurous chloride-ethyl sulfide complex was separated from the aqueous layer and was washed with two 50 ml. portions of water to remove the acid present, and a solution of 0.5 mole sodium acetate in 90 ml. water was added to buffer the hydrochloric acid subsequently formed by reaction with the mercaptan. The product was a dark yellow solid containing 59.0 percent gold that decomposed without melting ca. 193° C.

*Example 2.—Preparation of a gold aryl mercaptide from aurous chloride-methyl sulfide*

To a solution of 56.5 g. gold liquor containing 34.9 percent gold (0.1 mole) in 500 ml. water was added 18.6 g. methyl sulfide (0.3 mole) during 20 minutes with stirring and cooling to maintain the temperature below 5° C. Aurous chloride-methyl sulfide complex precipitated as a tan crystalline solid. The reaction mixture was diluted with 80 ml. chloroform, and a solution of 18.3 g. p-tert.-butylbenzenethiol (0.11 mole) in 20 ml. chloroform was added during 30 minutes with stirring and cooling to maintain the temperature between 5 and 12° C. After stirring for 40 minutes longer while warming to room temperature, the reaction was complete as shown by complete solution of the solids present. The supernatant aqueous layer was removed by decantation, and the residual chloroform layer was washed with three 250 ml. portions of water, decanting the water after each wash. Remaining water was removed in a separatory funnel, and the clear yellow chloroform solution was added dropwise with good agitation to one liter of methanol during 40 minutes. The mixture was stirred for 30 minutes longer and filtered. The precipitate, washed on the filter with 250 ml. methanol and dried, was 36.1 g. *gold p-tert.-butylphenyl mercaptide* as a yellow solid containing 54.3 percent gold that melted indefinitely between 205 and 215° C.

*Example 3.—Preparation of a gold aryl mercaptide from auric chloride*

A solution of 112.5 g. gold liquor containing 35 percent gold (0.2 mole) in 100 ml. ethyl acetate was added with stirring during ½ hour to 122.8 g. mixed dimethylbenzenethiols (0.8 mole), a commercial mixture of thioxylenols of about 90 percent purity. The temperature increased from 22 to 50° C. during the addition, and there was copious evolution of hydrogen chloride. After adding 25 ml. more ethyl acetate and stirring for ½ hour longer, the temperature had fallen to 30° C. The product was stirred well with 150 ml. acetone, allowed to settle, and the supernatant solvent layer was removed by siphoning. The residue was stirred well with 200 ml. acetone and filtered, and the precipitate was washed on the filter with 250 ml. acetone and air dried. The product was stirred well with 200 ml. benzene and was allowed to stand three days and filtered. The precipitate, washed on the filter with 200 ml. benzene and dried, was 67.8 g. *mixed gold dimethylphenyl mercaptides* as a pale yellow solid containing 58.1 percent gold that darkened ca. 205° C. and melted with decomposition about 230° C.

*Example 4.—Decorating compositions containing gold p-tert.-butylphenyl mercaptide*

A. *Bright gold decorating composition for brushing.*— A fluxed gold concentrate was prepared by mixing the following ingredients—

| Ingredient: | Parts by weight |
|---|---|
| Gold p-tert.-butylphenyl mercaptide dissolved in toluene (30 percent Au) | 100 |
| Rhodium resinate dissolved in a mixture of essential oils and hydrocarbons (1 percent Rh) | 15 |
| Bismuth resinate dissolved in a mixture of essential oils (4.5 percent Bi) | 10 |
| Chromium resinate dissolved in a mixture of cyclohexanone and oil of turpentine (2.05 percent Cr) | 3 |
| Oil of rosemary | 22 |
| Total | 150 |

A clear solution containing 20 percent gold was obtained.

A bright gold decorating composition for brushing was prepared by mixing the following ingredients—

| Ingredient: | Parts by weight |
|---|---|
| Fluxed gold concentrate | 300 |
| Sulfurized balsam | 168 |
| Cyclohexanone | 52 |
| Oil of rosemary | 51 |
| Nitrobenzene | 24 |
| Oil soluble red dye | 5 |
| Total | 600 |

The clear, red solution thus obtained contained 10 percent gold and was applied by brushing to a variety of articles, which were fired under conditions suitable for the individual article. In every case, adherent, conductive, metallic golden films were obtained on the articles, the appearance varying with the nature of the article as noted below.

| Article | Firing conditions | Appearance of film |
|---|---|---|
| A fiberglass laminated plastic panel | Infra-red, 10 minutes. | Bright. |
| Mica sheet | Infra-red, 20 minutes. | Do. |
| Titanium panel | Infra-red, 25 minutes. | Semi-bright. |
| Do | 480° C. kiln, 5 minutes. | Matte. |
| Stainless steel panel, type 430, polished surface. | Flash [1] | Bright. |
| Aluminum panel, polished surface | do [2] | Do. |
| Soda lime clear glass tumbler | 600° C. lehr | Do. |
| White porcelain enamel on steel panel | do | Do. |
| A glass-ceramic known as Pyroceram | do | Do. |
| Tempered soda lime opal glass dish | 630° C. kiln | Do. |
| Borosilicate opal glass dish | 650° C. kiln | Do. |
| Borosilicate clear glass tubing | do | Do. |
| Clear fused quartz panel | do | Do. |
| Hard porcelain (china) dish | 700° C. kiln | Do. |
| Glazed earthenware tile | do | Do. |

[1] The stainless steel panel was flash fired by inserting in a kiln at 500° C. and removing after 2 minutes.
[2] The aluminum panel was flash fired by inserting in a kiln at 550° C. and removing after 3 minutes.

B. *Bright gold decorating composition for screening or machine banding.*—A bright gold decorating composition suitable for screening or machine banding was prepared by mixing the following ingredients—

| Ingredients: | Parts by weight |
|---|---|
| The fluxed gold concentrates of A above | 60 |
| Sufurized balsam | 43 |
| Cyclohexanone | 15 |
| Oil of rosemary | 20 |
| Chloroform | 11 |
| Oil soluble red dye | 1 |
| Total | 150 |

The resulting solution was heated in an open dish on a steam bath until 64 parts by weight had evaporated, leaving 86 parts by weight of clear, viscous, dark red oil containing 14 percent gold. This was applied by screening through a 283 mesh Nitex screen onto a soda lime clear glass panel and by machine banding onto a soda lime clear glass tumbler and onto a glazed earthenware dish, and these articles were lehr fired to 600° C. In each case, bright, specular golden films were obtained.

C. *Bright gold decorating composition for stamping.*—A bright gold decorating composition suitable for stamping was prepared by further heating 50 parts by weight of the composition of B above in an open dish on a steam bath until an additional 7 parts by weight had evaporated, leaving 43 parts by weight of clear, very viscous, dark red oil containing 16.2 percent gold. This was rolled thin on a glass plate with a brayer. A rubber stamp was inked from the glass plate, and the design of the stamp was applied to a soda lime clear glass panel. On kiln firing to 600° C., the design appeared as a bright, specular golden film.

D. *Green gold decorating composition.*—A green gold decorating composition was prepared by mixing the following ingredients—

| Ingredients: | Parts by weight |
|---|---|
| The fluxed gold concentrate of A above | 300 |
| Silver resinate dissolved in a mixture of essential oils (24 percent Ag) | 75 |
| Sulfurized balsam | 190 |
| Oil of rosemary | 30 |
| Oil soluble red dye | 5 |
| Total | 600 |

The clear red solution thus obtained contained 10 percent gold and 3 percent silver and was applied by brushing to a soda lime clear glass tumbler, which was kiln fired to 600° C., and to a glazed earthenware tile, which was kiln fired to 740° C. In each case, bright, specular golden films with a greenish to lemon yellow cast were obtained.

E. *Gold luster decorating composition.*—A gold luster decorating composition was prepared by mixing the following ingredients—

| Ingredients: | Parts by weight |
|---|---|
| The fluxed gold concentrate of A above | 10 |
| Bismuth resinate dissolved in a mixture of essential oils (4.5 percent Bi) | 37 |
| Rosin dissolved in oil of turpentine (50 percent rosin) | 120 |
| Chloroform | 32 |
| Oil soluble red dye | 1 |
| Total | 200 |

The clear red solution thus obtained contained 1 percent gold and was appiled by brushing to a soda lime clear glass tumbler and to a glazed ceramic tile. When the tumbler was kiln fired to 600° C., a bright purple, non-conductive film with a golden iridescence was obtained. When the tile was kiln fired to 740° C., a bright, deep purple, non-conductive film with a golden iridescence was obtained.

F. *Matte gold decorating composition.*—A matte gold decorating composition was obtained by mixing the following ingredients—

Ingredients: Parts by weight
    The fluxed gold concentrate of A above _____ 80
    Lead borate _____ 3
    Bismuth subnitrate _____ 1
    Sulfurized balsam _____ 60
    Oil of rosemary _____ 16

Total _____ 160

The resulting suspension contained 10 percent gold and was applied by brushing to a soda lime clear glass tumbler, which was kiln fired to 600° C., and to a glazed earthenware tile, which was kiln fired to 740° C. In each case a matte golden film was obtained.

G. *Bright platinum decorating compositions.*—A gold concentrate containing 20 percent gold was prepared by mixing the following ingredients to give a clear solution—

Ingredients: Parts by weight
    Gold p-tert.-butylphenyl mercaptide dissolved
        in toluene (30 percent Au) _____ 1500
    Rhodium resinate dissolved in a mixture of essential oils and hydrocarbons (1 percent Rh) _____ 225
    Sulfurized balsam _____ 250
    Oil of rosemary _____ 275

Total _____ 2250

A flux concentrate was prepared by mixing the following ingredients to give a clear solution—

Ingredients: Parts by weight
    Bismuth resinate dissolved in a mixture of essential oils (4.5 percent Bi) _____ 20
    Chromium resinate dissolved in a mixture of cyclohexanone and oil of turpentine (2.05 percent Cr) _____ 5
    Sulfurized balsam _____ 187
    Cyclohexanone _____ 53
    Oil of rosemary _____ 50
    Oil soluble red dye _____ 5

Total _____ 320

A bright platinum decorating composition was prepared by mixing the following ingredients—

Ingredients: Parts by weight
    The gold concentrate above _____ 18
    Platinum resinate dissolved in a mixture of essential oils (12 percent Pt) _____ 60
    Rhodium resinate dissolved in a mixture of essential oils and hydrocarbons (1 percent Rh) _____ 12
    The flux concentrate above _____ 30

Total _____ 120

The clear, dark red solution thus obtained contained 3 percent gold and 6 percent platinum and was applied by brushing to a soda lime clear glass tumbler, which was kiln fired to 600° C., and to a glazed ceramic tile, which was kiln fired to 740° C. In each case bright, specular silvery films were obtained that were excellent conductors of electricity and were readily solderable.

Another bright platinum decorating composition was prepared by mixing the following ingredients—

Ingredients: Parts by weight
    The gold concentrate above _____ 18
    Chloroplatinous n-octylmercaptide-ethyl sulfide complex, Example XVIII of U.S. Patent No. 3,022,177, dissolved in toluene (30 percent Pt) _____ 21
    Rhodium resinate dissolved in a mixture of essential oils and hydrocarbons (1 percent Rh) _____ 12
    The flux concentrate above _____ 64
    Oil of Rosemary _____ 5

Total _____ 120

The clear, red solution thus obtained contained 3 percent gold and 5.25 percent platinum and was applied by brushing to a soda lime clear glass tumbler and to a glazed ceramic tile. The tumbler and tile were fired as described above, giving films substantially identical to those obtained from the above composition containing platinum resinate.

H. *Bright palladium decorating compositions.*—A bright palladium decorating composition was prepared by mixing the following ingredients—

Ingredients: Parts by weight
    The gold concentrate of G above _____ 54
    Palladium resinate dissolved in a mixture of essential oils and hydrocarbons (9 percent Pd) _____ 20
    The flux concentrate of G above _____ 46

Total _____ 120

The clear, dark red solution thus obtained contained 9 percent gold and 1.5 percent palladium. It was applied by brushing to a soda lime clear glass tumbler, which was kiln fired to 600° C., and to a glazed ceramic tile, which was kiln fired to 740° C. In each case bright, specular silvery films were obtained that were excellent conductors of electricity and were readily solderable.

Another bright palladium decorating composition was prepared by mixing the following ingredients—

Ingredients: Parts by weight
    The gold concentrate of G above _____ 13
    Dichlorobisdi-n-butylsulfidepalladium (II) dissolved in toluene, Example I of U.S. Patent application Serial No. 60,575, filed Oct. 5, 1960 (20 percent Pd) _____ 2
    The flux concentrate of Example 5 _____ 16

Total _____ 31

The turbid red solution thus obtained contained 8.4 percent gold and 1.3 percent palladium and was applied by brushing to a soda lime clear glass tumbler and to a glazed earthenware tile. The tumbler and tile were fired as described above, giving films substantially identical to those obtained from the above composition containing palladium resinate.

I. *Burnish gold decorating composition.*—A burnish gold decorating composition was prepared by mixing the following ingredients—

Ingredients: Parts by weight
    Gold p-tert.-butylphenyl mercaptide (53.3 percent Au) _____ 100
    Mercuric oxide _____ 60
    Lead borate _____ 9
    Bismuth subnitrate _____ 3
    Rosin dissolved in oil of turpentine (50 percent rosin) _____ 40
    Oil of turpentine _____ 40
    Toluene _____ 40

Total _____ 292

The resulting paste containing 18.3 percent gold was applied by brushing to a glazed ceramic tile, which was kiln fired to 740° C. A matte golden film was obtained that gave a rich, lustrous golden film on being burnished by rubbing with wet burnishing sand.

J. *Thermoplastic gold decorating composition.*—A thermoplastic gold decorating composition suitable for hot screening was prepared by mixing the following ingredients—

| Ingredients: | Parts by weight |
|---|---|
| Gold p-tert.-butylphenyl mercaptide dissolved in toluene (17.8 percent Au) | 45 |
| Rhodium resinate dissolved in a mixture of essential oils and hydrocarbons (1 percent Rh) | 4 |
| Bismuth resinate dissolved in a mixture of essential oils (4.5 percent Bi) | 3 |
| Chromium resinate dissolved in a mixture of cyclohexanone and oil of turpentine (2.05 percent Cr) | 1 |
| Sulfurized balsam | 25 |
| Hydrogenated rosin ("Staybelite Resin") | 10 |
| Stearic acid | 30 |
| Finely divided melamine powder | 6 |
| Nitrobenzene | 25 |
| Total | 149 |

The mixture was held in an open dish with occasional stirring on a steam bath under an infra-red lamp until 74 parts by weight had evaporated. The residue was 75 parts by weight of a viscous oil containing 10.7 percent gold that set to a hard solid on cooling to room temperature. This was applied to a soda lime clear glass tumbler by screening through a 325 mesh stainless steel screen maintained at about 85° C. The applied film immediately set to a hard tack-free state and gave a bright gold film on kiln firing to 600° C.

K. *Dusting gold decorating composition.*—A dusting gold decorating composition was prepared by grinding together a mixture of the following ingredients to give a fine yellow powder containing 15.2 percent gold.

| Ingredients: | Parts by weight |
|---|---|
| Gold p-tert.-butylphenyl mercaptide (53.3 percent Au) | 20 |
| Mercuric oxide | 46 |
| Lead borate | 3 |
| Bismuth subnitrate | 1 |
| Total | 70 |

A stamping medium was prepared by heating a mixture of 20 parts by weight sulfurized balsam and 2 parts by weight of a solution of rhodium resinate in a mixture of essential oils and hydrocarbons (1 percent Rh) on a steam bath until 20 parts by weight remained. The viscous tacky medium thus obtained was applied in the form of a decorative design by stamping on a glazed earthenware tile. The surface of the tile was dusted with the above dusting composition, and excess dust not adhering to the design was removed by brushing. On kiln firing to 740° C., a matte, golden film was obtained.

*Example 5.—Decorating composition containing gold m-methylphenyl mercaptide*

A flux concentrate was prepared by mixing the following ingredients—

| Ingredients: | Parts by weight |
|---|---|
| Rhodium resinate dissolved in a mixture of essential oils and hydrocarbons (1 percent Rh) | 6 |
| Bismuth resinate dissolved in a mixture of essential oils (4.5 percent Bi) | 4 |
| Chromium resinate dissolved in a mixture of cyclohexanone and oil of turpentine (2.05 percent Cr) | 1 |
| Sulfurized balsam | 38 |
| Cyclohexanone | 11 |
| Total | 60 |

A gold decorating composition was prepared by mixing the following ingredients on a roll mill—

| Ingredients: | Parts by weight |
|---|---|
| Gold m-methylphenyl mercaptide (60.7 percent Au) | 17 |
| Flux concentrate | 30 |
| Rosin dissolved in oil of turpentine (50 percent rosin) | 3 |
| Total | 50 |

The resulting paste containing 20.6 percent gold was thinned to brushing consistency with oil of turpentine and applied by brushing to a glazed ceramic tile, which was kiln fired to 740° C. A matte, dark golden film was obtained that gave a soft, lustrous golden film on burnishing.

*Example 6.—Decorating composition containing gold pentachlorophenyl mercaptide*

A gold decorating composition was prepared by mixing the following ingredients on a roll mill—

| Ingredients: | Parts by weight |
|---|---|
| Gold pentachlorophenyl mercaptide (40.6 percent Au) | 15 |
| The flux concentrate of Example 5 | 30 |
| Rosin dissolved in oil of turpentine (50 percent rosin) | 3 |
| Total | 48 |

The resulting paste containing 12.7 percent gold was thinned to brushing consistency with oil of turpentine and applied by brushing to a glazed ceramic tile, which was kiln fired to 740° C. The resulting semi-bright golden film gave a lustrous, bright golden film on burnishing.

*Example 7.—Decorating composition containing gold o-aminophenyl mercaptide*

A gold decorating composition was prepared by mixing the following ingredients on a roll mill—

| Ingredients: | Parts by weight |
|---|---|
| Gold o-aminophenyl mercaptide (59.0 percent Au) | 15 |
| The flux concentrate of Example 5 | 30 |
| Rosin dissolved in oil of turpentine (50 percent rosin) | 3 |
| Total | 48 |

The resulting paste containing 18.4 percent gold was thinned to brushing consistency with oil of turpentine and applied by brushing to a glazed ceramic tile, which was kiln fired to 740° C. The resulting matte gold film gave a rich, lustrous golden film on burnishing.

*Example 8.—Decorating composition containing gold o-carboxy-phenyl mercaptide*

A gold decorating composition was prepared by mixing the following ingredients on a roll mill—

| Ingredients: | Parts by weight |
|---|---|
| Gold o-carboxy-phenyl mercaptide (56.3 percent Au) | 15 |
| The flux concentrate of Example 5 | 30 |
| Rosin dissolved in oil of turpentine (50 percent rosin) | 5 |
| Total | 50 |

The resulting paste containing 16.9 percent gold was thinned to brushing consistency with oil of turpentine and brushed on a glazed ceramic tile, which was kiln fired to 740° C. A matte gold film was obtained that gave a semi-bright golden film on burnishing.

Example 9.—Decorating composition containing gold p-chlorophenyl mercaptide

A gold decorating composition was prepared by mixing the following ingredients on a roll mill—

| Ingredients: | Parts by weight |
|---|---|
| Gold p-chlorophenyl mercaptide (57.5 percent Au) | 15 |
| The flux concentrate of Example 5 | 30 |
| Rosin dissolved in oil of turpentine (50 percent rosin) | 5 |
| Total | 50 |

The resulting paste containing 17.3 percent gold was thinned to brushing consistency with oil of turpentine and brushed on a glazed ceramic tile, which was kiln fired to 740° C. A matte, brown film was obtained that gave a semi-bright golden film on burnishing.

Example 10.—Decorating compositions containing gold mixed dimethylphenyl mercaptides A gold decorating composition was prepared by mixing the following ingredients on a roll mill—

| Ingredients: | Parts by weight |
|---|---|
| Gold mixed dimethylphenyl mercaptides (58.1 percent Au) | 15 |
| The flux concentrate of Example 5 | 30 |
| Rosin dissolved in oil of turpentine (50 percent rosin) | 5 |
| Total | 50 |

The resulting paste containing 17.4 percent gold was thinned to brushing consistency with oil of turpentine and brushed on a glazed ceramic tile, which was kiln fired to 740° C. A matte gold film was obtained that gave a lustrous golden film on burnishing.

Another gold decorating composition was prepared by mixing the following ingredients on a roll mill—

| Ingredients: | Parts by weight |
|---|---|
| Gold mixed dimethylphenyl mercaptides (58.1 percent Au) | 30 |
| Rhodium resinate dissolved in a mixture of essential oils and hydrocarbons (1 percent Rh) | 6 |
| Lead borate | 3 |
| Bismuth subnitrate | 1 |
| Sulfurized balsam | 36 |
| Cyclohexanone | 20 |
| Oil of rosemary | 4 |
| Total | 100 |

The resulting paste containing 17.4 percent gold was thinned to brushing consistency with oil of turpentine and brushed on a glazed ceramic tile, which was kiln fired to 740° C. A matte brown film was obtained that gave a lustrous semi-bright golden film on burnishing.

Example 11.—Decorating compositions containing gold mixed methylphenyl mercaptides A burnish gold decorating composition was prepared by mixing the following ingredients on a roll mill—

| Ingredients: | Parts by weight |
|---|---|
| Gold mixed methylphenyl mercaptides (61.4 percent Au) | 15 |
| The flux concentrate of Example 5 | 30 |
| Rosin dissolved in oil of turpentine (50 percent rosin) | 5 |
| Total | 50 |

The resulting paste containing 18.4 percent gold was thinned to brushing consistency with oil of turpentine and brushed on a glazed ceramic tile, which was kiln fired to 740° C. A matte brown film was obtained that gave a rich, lustrous golden film on burnishing.

A semi-bright gold decorating composition was prepared by mulling the following ingredients on a glass slab—

| Ingredients: | Parts by weight |
|---|---|
| Gold mixed methylphenyl mercaptides (61.4 percent Au) | 36 |
| Gold resinate dissolved in a mixture of essential oils (24 percent Au) | 32 |
| The flux concentrate of Example 4–G | 150 |
| Total | 218 |

The resulting paste was shaken well with 15 parts by weight of rhodium resinate dissolved in a mixture of essential oils and hydrocarbons (1 percent Rh) and 67 parts by weight of oil of rosemary to give 300 parts by weight of a fine suspension containing 9.9 percent gold. This was applied by brushing to a soda lime clear glass tumbler, which was kiln fired to 600° C., and to a glazed ceramic tile, which was kiln fired to 740° C. In each case, semi-bright golden films were obtained.

Example 12.—Decorating composition containing gold o-methylphenyl mercaptide

A gold decorating composition was prepared by mixing the following ingredients on a roll mill—

| Ingredients: | Parts by weight |
|---|---|
| Gold o-methylphenyl mercaptide (61.5 percent Au) | 15 |
| The flux concentrate of Example 5 | 30 |
| Rosin dissolved in oil of turpentine (50 percent rosin) | 5 |
| Total | 50 |

The resulting paste containing 18.5 percent gold was thinned to brushing consistency with oil of turpentine and brushed on a glazed ceramic tile, which was kiln fired to 740° C. A matte gold film was obtained that gave a semi-bright golden film on burnishing.

Example 13.—Decorating composition containing gold p-methylphenyl mercaptide

A gold decorating composition was prepared by mixing the following ingredients on a roll mill—

| Ingredients: | Parts by weight |
|---|---|
| Gold p-methylphenyl mercaptide (61.5 percent Au) | 15 |
| The flux concentrate of Example 5 | 30 |
| Rosin dissolved in oil of turpentine (50 percent rosin) | 5 |
| Total | 50 |

The resulting paste containing 18.5 percent gold was thinned to brushing consistency with oil of turpentine and brushed on a glazed ceramic tile, which was kiln fired to 740° C. A matte brown film was obtained that gave a lustrous golden film on burnishing.

Example 14.—Decorating composition containing gold 2-naphthyl mercaptide

A gold decorating composition was prepared by mixing the following ingredients on a roll mill—

| Ingredients: | Parts by weight |
|---|---|
| Gold 2-naphthyl mercaptide (53.2 percent Au) | 15 |
| The flux concentrate of Example 5 | 30 |
| Rosin dissolved in oil of turpentine (50 percent rosin) | 5 |
| Total | 50 |

The resulting paste containing 16 percent gold was thinned to brushing consistency with oil of turpentine and brushed on a glazed ceramic tile, which was kiln fired to 740° C. A matte brown film was obtained that gave a rich, lustrous golden film on burnishing.

*Example 15.—Decorating compositions containing gold phenyl mercaptide*

A burnish gold decorating composition was prepared by mixing the following ingredients on a roll mill—

| Ingredients: | Parts by weight |
|---|---|
| Gold phenyl mercaptide (63.5 percent Au) | 15 |
| The flux concentrate of Example 5 | 30 |
| Rosin dissolved in oil of turpentine (50 percent rosin) | 5 |
| Total | 50 |

The resulting paste containing 19.1 percent gold was thinned to brushing consistency with oil of turpentine and brushed on a glazed ceramic tile, which was kiln fired to 740° C. A matte brown film was obtained that gave a lustrous golden film on burnishing.

A semi-bright gold decorating composition was prepared by mulling the following ingredients on a glass plate—

| Ingredients: | Parts by weight |
|---|---|
| Gold phenyl mercaptide (63.5 percent Au) | 7 |
| Gold tert.-dodecyl mercaptide dissolved in heptane (30 percent gold) | 5 |
| The flux concentrate of Example 5 | 30 |
| Total | 42 |

The resulting paste was shaken well with 18 parts by weight of oil of rosemary to give 60 parts by weight of a fine suspension containing 9.9 percent gold. This was brushed on a soda lime clear glass tumbler, which was kiln fired to 600° C., and on a glazed ceramic tile, which was kiln fired to 740° C. In each case a semi-bright golden film was obtained.

Another semi-bright gold decorating composition was prepared by mulling the following ingredients on a glass plate—

| Ingredients: | Parts by weight |
|---|---|
| Gold phenyl mercaptide (63.5 percent Au) | 46 |
| Gold pinene mercaptide (53.8 percent Au) | 56 |
| The flux concentrate of Example 4–G | 300 |
| Total | 402 |

The resulting paste was shaken with 30 parts by weight of a solution of rhodium resinate in a mixture of essential oils and hydrocarbons (1 percent Rh) and 168 parts by weight of oil of rosemary to give 600 parts by weight of a fine suspension containing 9.9 percent gold. This was brushed on a soda lime clear glass tumbler, which was kiln fired to 600° C., and on a glazed ceramic tile, which was kiln fired to 740° C. In each case a semi-bright golden film was obtained.

*Example 16.—Decorating composition containing gold p-nonylphenyl mercaptide*

A bright gold decorating composition was prepared by mixing the following ingredients—

| Ingredients: | Parts by weight |
|---|---|
| Gold p-nonylphenyl mercaptide (43.2 percent Au) | 69 |
| The flux concentrate of Example 5 | 200 |
| Toluene | 31 |
| Total | 300 |

The resulting clear red solution containing 10 percent gold was brushed on a glazed ceramic tile, which was kiln fired to 740° C. A bright, specular golden film was obtained.

*Example 17.—Decorating composition containing gold o-methyl-p-tert.-butylphenyl mercaptide*

A bright gold decorating composition was prepared by mixing 15 parts by weight of a solution of gold o-methyl-p-tert.-butylphenyl mercaptide in toluene (16.7 percent Au) with 15 parts by weight of the flux concentrate of Example 5 to give 30 parts by weight of a turbid solution containing 8.4 percent gold. This was brushed on a soda lime clear glass tumbler, which was kiln fired to 600° C., and on a glazed ceramic tile, which was kiln fired to 740° C. In each case a bright, specular golden film was obtained.

It will be obvious to those skilled in the art that many modifications may be made within the scope of the present invention without departing from the spirit thereof, and the invention includes all such modifications.

What is claimed is:

1. A liquid gold decorating composition comprising a nuclear-substituted gold aryl mercaptide wherein the mercapto sulfur is attached directly to the aryl nucleus and including at least one alkyl group containing at least three carbon atoms attached directly to the aryl nucleus, in solution in an organic vehicle and a gold flux.

2. A liquid gold decorating composition comprising a gold aryl mercaptide having the formula Ar—S—Au wherein Ar is aryl, the mercapto sulfur is attached directly to the aryl nucleus, and at least one alkyl group containing from about 4–12 carbon atoms is attached directly to the aryl nucleus, in solution in an organic vehicle and a liquid bright platinum.

3. A liquid gold decorating composition comprising a gold aryl mercaptide having the formula Ar—S—Au wherein Ar is aryl, the mercapto sulfur it attached directly to the aryl nucleus, and at least one alkyl group containing from about 4–12 carbon atoms is attached directly to the aryl nucleous, in solution in an organic vehicle and a liquid bright palladium.

4. The decorating composition of claim 1 wherein the gold aryl mercaptide is gold p-tert.-butylphenyl mercaptide.

5. The decorating composition of claim 1 wherein the gold aryl mercaptide is gold o-methyl-p-tert.-butylphenyl mercaptide.

6. The decorating composition of claim 1 wherein the gold aryl mercaptide is gold p-nonylphenyl mercaptide.

References Cited by the Examiner

UNITED STATES PATENTS

| 2,607,789 | 8/1952 | Weiss et al. | 260—430 |
| 2,994,614 | 8/1961 | Fitch | 106—1 |

ALEXANDER H. BRODMERKEL, *Primary Examiner.*

JOHN R. SPECK, *Examiner.*